US007308084B2

(12) United States Patent
Best et al.

(10) Patent No.: US 7,308,084 B2
(45) Date of Patent: Dec. 11, 2007

(54) METHOD AND APPARATUS OF ASSOCIATING FILE DESCRIPTION DURING A BROWSER-INITIATED DOWNLOAD

(75) Inventors: Steven Francis Best, Georgetown, TX (US); Michael Richard Cooper, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 762 days.

(21) Appl. No.: 10/455,155

(22) Filed: Jun. 5, 2003

(65) Prior Publication Data

US 2004/0249783 A1  Dec. 9, 2004

(51) Int. Cl.
*H04M 1/64* (2006.01)
(52) U.S. Cl. .......................... 379/88.19; 704/9; 707/1; 709/230
(58) Field of Classification Search ............. 379/88.19; 704/9; 707/1; 709/230
See application file for complete search history.

(56) References Cited

U.S. PATENT DOCUMENTS 7,072,971 B2 *  7/2006  Lassen et al. ............... 709/230

OTHER PUBLICATIONS

Sami Menefee, *Lincoln Beach Software Ships Download Buffer 2.0*, Newsbytes, Inc., May 12, 1998, Ballwin, Missouri, USA.

\* cited by examiner

*Primary Examiner*—Gerald Gauthier
(74) *Attorney, Agent, or Firm*—D'Ann N. Rifai; Dillon & Yudell LLP

(57) ABSTRACT

A method for providing additional descriptive information about a file during a download to a local computer so that functional and descriptive aspects of the file may easily be reviewed without having to open the file. A software application is provided that enhances current browser software. When a user desires to download a file from a remote source, the application causes the browser to link to the web site and retrieve particular descriptive information/data associated with the file, including the URL. Concurrently, a dialog box is opened and displayed on the display device of the local computer. The dialog box includes a text entry area in which the user can enter personalized identifying data/information about the file being downloaded. The downloaded file is saved along with the data retrieved from the web site as well as the user-entered data/information. The additional information is stored as extended attributes linked to the file and are retrieved without opening the file.

20 Claims, 6 Drawing Sheets

METHOD AND APPARATUS OF ASSOCIATING FILE DESCRIPTION DURING A BROWSER-INITIATED DOWNLOAD

BACKGROUND OF THE INVENTION

1. Technical Field

The present invention relates generally to file storage and in particular to file downloads with browser applications. Still more particularly, the present invention relates to storing of descriptive data during a download of a file utilizing a browser application on a computer system.

2. Description of the Related Art

Methods of downloading files from a server of a network (such as the Internet) on to a storage device of a local system (i.e., a network connected computer on which the file download is initiated and the file stored) is well known in the computer arts. Most current examples of file download involve a browser executing on a local system downloading a file from a server on the Internet. Utilizing one of the various browser applications, users download files from the Internet to their local machine. However, other types of file downloads are frequently completed.

There are several types of files that are commonly downloaded, including executable files, compressed version of a group of files (zip, tar, etc.), word documents, and pdf files. Often, files that are retrieved on a server and downloaded to the client system contain non-descriptive names. These names are assigned by the developer/programmer, whose main concern is not providing user-friendly or descriptive filenames for the file/application. Later users of the file thus have no idea and are unable at times to ascertain where the file came from and what the file is used for. For example, an executable file for installing a software/application may be called run.exe. Although, this name identifies the file as a run file that is executable, there is no indication from that name what the actual functionality of the underlying software is. When downloaded to the local system, the file saves to a selected drive and directory as run.exe. If the user later wishes to obtain information about the file, the user has to execute the file in order to determine what descriptive feature is associated with run.exe. As another example, when a user downloads Microsoft's media player, the web page provides a file name of mpfull.exe, which is downloaded from the world wide web (www) site of microsoft-.com /windowsmedia/download/default.asp and saved on the user's system. Later access to the mpfull.exe file provides little descriptive or origination information to the user, who would have little problem identifying the file if provided the URL and a proper description such as "Windows Media Player version ######."

With some browser applications, a user is able to select the drive and directory to which the file may be stored. Also, the user may be able to change the name of the file prior to storing the file with the new user entered name. Of course, the filename provides only a limited description of the functionality of the underlying file.

One current improvement on the prior art is described in the Lincoln Beach software article. The Lincoln Beach method, Download Butler 2.0, provides an external application that assigns URL information along with the file being downloaded. The URL information may then be viewed inside the GUI of the extended application when the file is accessed within the external application. While providing URL information is helpful, the URL by itself does not necessarily provide enough information about the file itself, other than the file location on the Internet. Also, without the specific external application, a user browsing through the main file directory of the computer is unable to view the URL information associated with the file.

The present invention recognizes that it would be desirable to provide a method and system for retrieving and associating descriptive attributes of a file during a download of the file on a system. A method and system that enables the user to enter descriptive text about a file besides the name and later view the descriptive text and other descriptive file data without actually opening the file would be a welcomed improvement. These and other benefits are provided by the invention described herein.

SUMMARY OF THE INVENTION

Disclosed is a method, system, and computer program product for providing additional descriptive information about a file during a download to a local computer so that functional and descriptive aspects of the file may easily be reviewed without later having to open the file. A software application is provided that enhances current browser software. When a user desires to download a file from a remote source, the application causes the browser to link to the web site and retrieve particular descriptive information/data associated with the file, including the URL. Concurrently, a dialog box is opened and displayed on the display device of the local computer. In addition to the name and directory selection entry blocks, the dialog box includes a text entry area in which the user can enter personalized identifying data/information about the file being downloaded. When the user then selects the save option in the dialog box, the file is saved along with the data automatically retrieved from the web site as well as the user-entered data/information. The additional information is stored as meta-data linked to the file and retrieved without opening the file.

A user is later able to inquire about the file without necessarily having to open the file. The user merely right clicks on the file (or change directory/file view) and the stored meta-data information (which includes all the additional descriptive information) is provided on the display terminal, in one embodiment. Right clicking on the file opens a dialog box with the descriptive information, including the URL. In this way, a file having a non-descriptive name and/or non-descriptive URL can quickly be checked for identifying description.

Information stored within the meta-data may include the file name, the URL of the web site from which the file is downloaded, the size of the file, the version of the file, and the date/time for obtaining a next update to the file. Additionally, the user-entered text is included. In one embodiment, the URL is stored within the meta-data as a hot-link. The user is then able to click on the URL and is immediately connected to the web site from which the file was originally downloaded. Updates to the file can then be easily obtained without requiring the user to have knowledge of the site from which the file was originally downloaded.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a novel download functionality that enables additional descriptive information to be retrieved and/or entered and stored along with a file that is being downloaded to a client system. The additional information is then available to better identify the file to a user viewing the file after download, rather than having the user rely only on an arbitrary name assigned to the file by the creator of the file. According to the illustrative embodiment, a software coded utility is provided as a downloadable plug-in that overrides the default download dialog of the browser applications on the client system. Alternatively, the utility is provided as a program code on a computer readable medium and may be packaged with existing applications or shipped as a separate utility.

The enhanced download options (EDO) utility (or enhanced download application (EDA)) adds information about the file using additional functionality that file systems provide in extended attributes. Currently most (if not all) file systems (e.g., FAT, HPFS, JFS, NTFS, to name a few) support the concept of EAs (extended attributes). The invention takes advantage of and expands the functionality of extended attributes to provide more information along with the arbitrary name/value pairs that are associated with a file. The invention is thus applicable to and supported across most platforms.

Figure 1A:
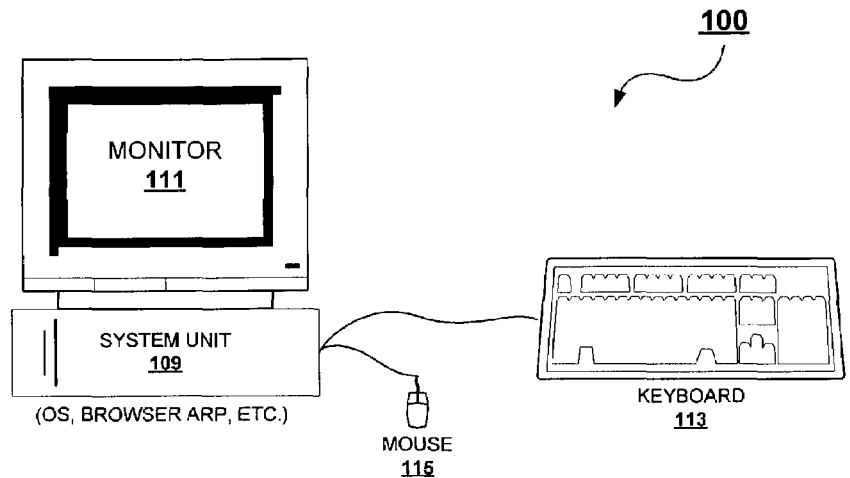
FIGS. 1A and 1B are block diagrams illustrating an external and an internal view of a computer system within which the features of the invention may be implemented.
Figure 1B:
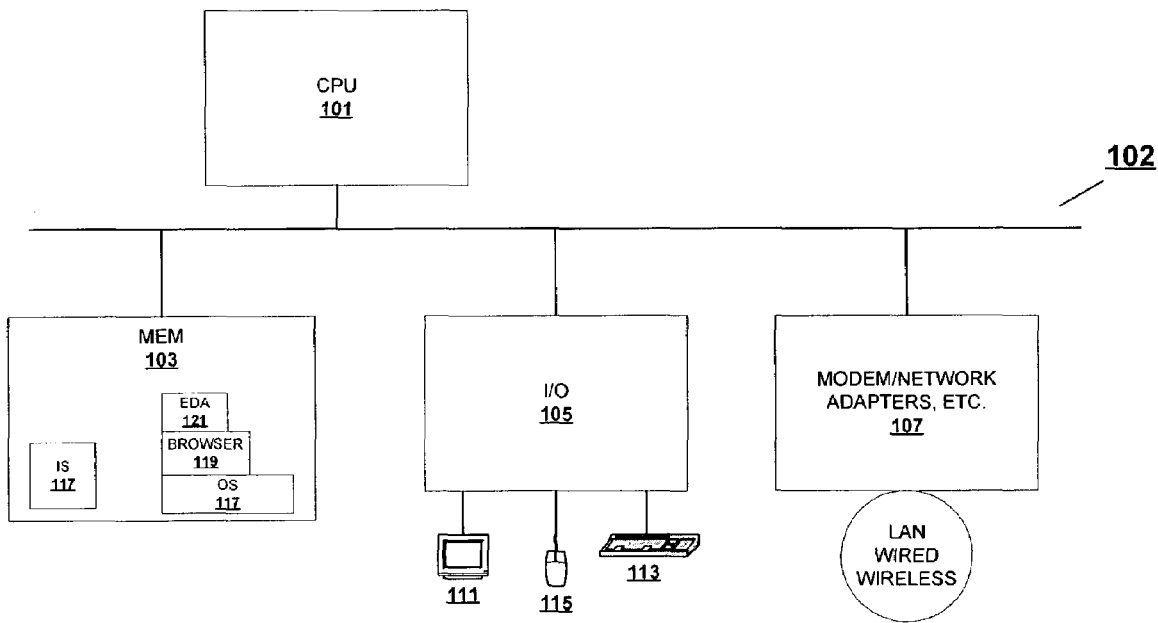

With reference now to the figures and in particular with reference to FIGS. 1A and 1B, there are illustrated two representations of a data processing system within which the features of the invention may advantageously be implemented. FIG. 1A illustrates an external view of data processing system 100, while FIG. 1B illustrates the internal connectivity view of data processing system 100. In FIG. 1A, data processing system 100 comprises system unit 109 to which is connected various input/output (I/O) devices, including mouse 115, keyboard 113, and monitor 111. I/O devices collectively are utilized to complete the various manipulation of software applications, as described below, by which file downloads are completed. Specifically, graphical user interfaces and a dialog box are displayed to a user via monitor 111 and user interaction with these GUIs and dialog boxes are completed utilizing mouse 115 and keyboard 113.

The internal connectivity view of data processing system provides several internal components (some housed within system unit 109) required for operation of data processing system and connection of data processing system to an external network. Data processing system 100 comprises central processing unit (CPU) 101, memory 103, and I/O 105, each interconnected to each other via system bus 102. Memory 103 comprises storage locations that may be utilized to store files and meta-data that are being downloaded and later accessed as is described below. Stored within memory are several software components, including operating system (OS) 117, browser application/utility 119, and enhanced download application 121. OS 117, browser application 119, and EDA 121 are executed by CPU 101 during implementation of the invention. In the illustrative embodiment, and as described in greater detail below, browser application 119 and EDA 121 exist as separate applications; However, the invention also contemplates incorporating the features of EDO utility within new designs of browser applications.

Also connected to system bus 102 is network connectivity components 107, which may include modems, network adapters, etc. Network connectivity components 107 enable data processing system 100 to connect to a remote network and download files thereon. Network connectivity components 107 may provide for one or more alternative means of connection to the network including direct wired connection, wireless connection, etc.

Figure 2:
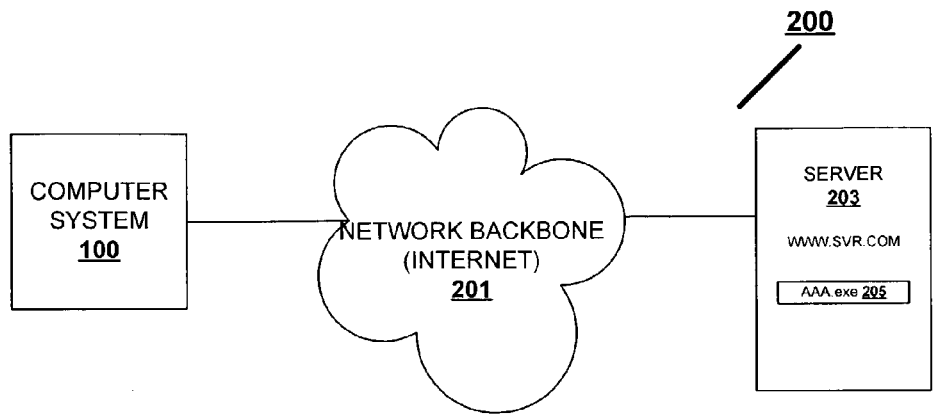
FIG. 2 illustrates a basic network utilized to provide the download of files to a local system according to one embodiment of the invention.

FIG. 2 illustrates a general network according to one embodiment of the invention. Network 200 comprises a network backbone 201, which includes at least one server 203 that hosts server applications. Network 200 also comprises a computer system (or local system) 202, which is assumed to be similarly configured to data processing system 100 of FIGS. 1A and 1B. For illustrative purposes and ease of discussion, network backbone 201 is represented as the Internet, and server 203 is an Internet-based server having a corresponding universal resource locator (URL). Within server 203 are a plurality of files 205 that may be selectively downloaded by local system 202 implementing the EDA functionality of the invention.

As described above, the invention provides a software-coded utility (EDA 121) that enables additional information to be saved along with the filename of the downloaded file. In one embodiment, current applications (such as browser applications) are enhanced to enable associating additional information to a file in the form of an extended attribute (EA). Some of the additional information is "grabbed" from the source of the file (HTTP page) to determine what the file is and where the file comes from. That is, some of the additional information is available from the web page sourcing the file and the invention enables the browser to grab (extract) this information when the file is being selected for download.

Figure 4A:
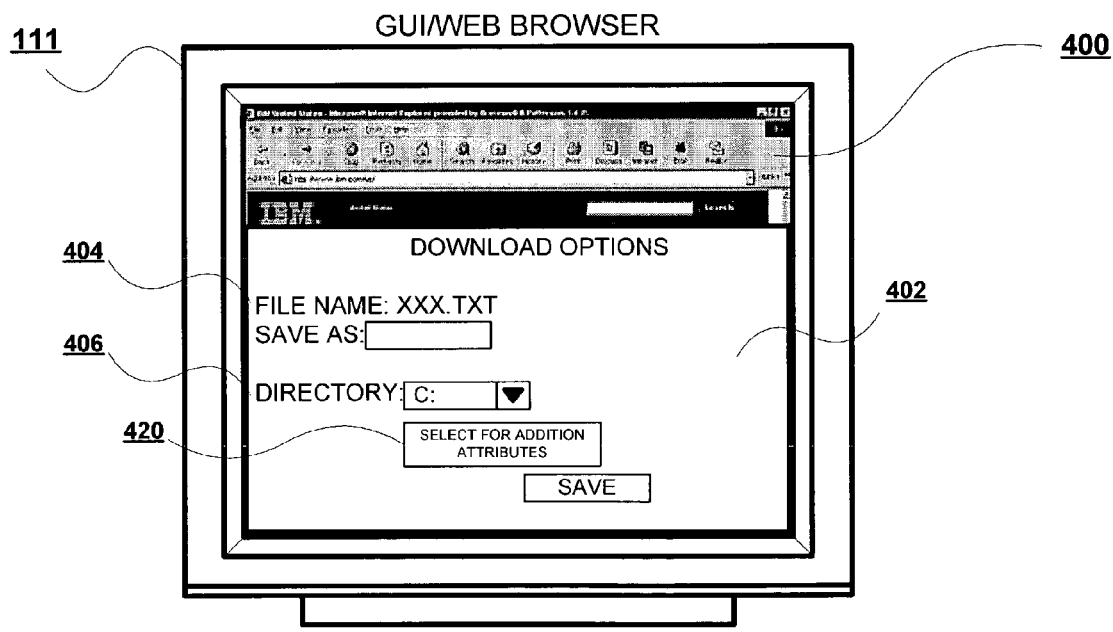
FIGS. 4A-4C illustrate the download utility of a browser enhanced to enable collection of additional descriptive information and extended attributes during download of a file according to one embodiment of the invention.
Figure 4B:
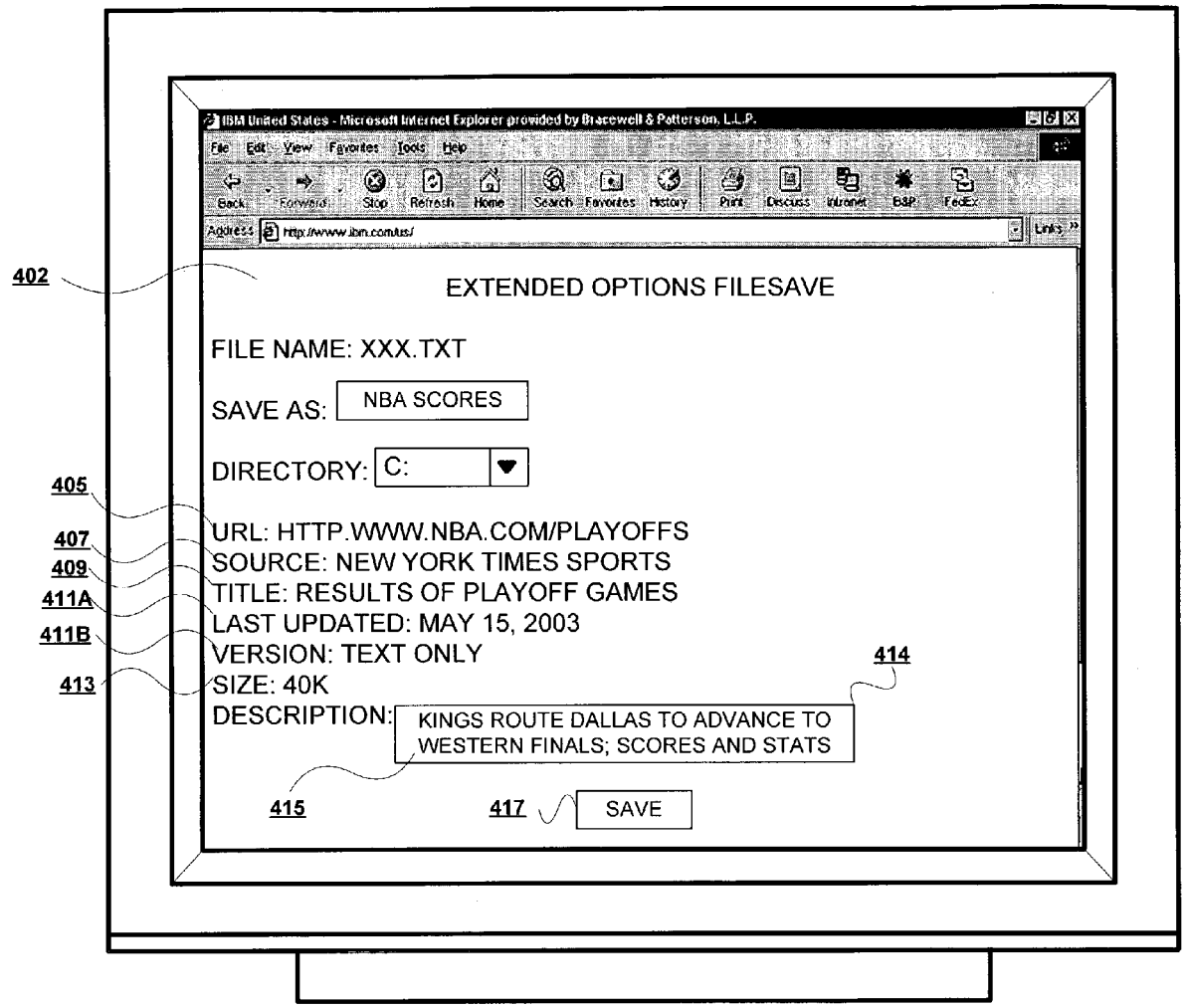
Figure 4C:
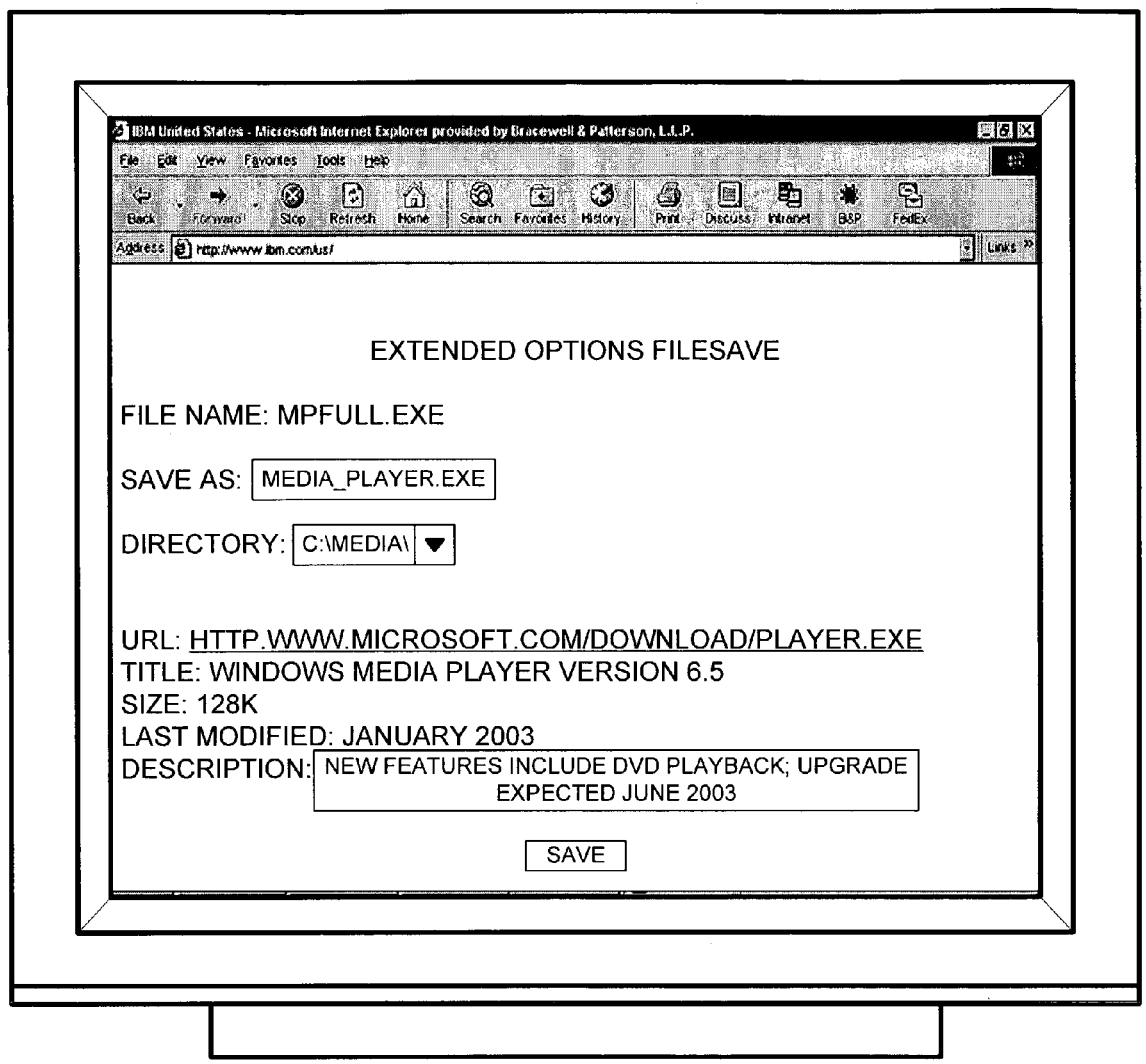

FIGS. 4A-4C provides a series of GUIs within a browser that illustrates how the download process is completed and what additional information is actually retrieved/entered and stored with the file. As is clear from the illustrations, each file has more than one extended attribute, depending on the source of the file. Examples of additional information stored in the extended attributes include: http page from where the file was downloaded, http title of the page, last modified date, and user-entry field for user-defined attributes text about the file.

FIG. 4A illustrates a GUI (child window) of browser 400 displayed on monitor 111 of data processing system 100. As illustrated therein, the user has initiated a download of a file xxx.txt and is being prompted to enter a different file name in save as name field 404 to save the file as well as a directory in directory field 406. The former feature (selection of a different file name) is optional and is not included in some current applications, although that feature is included in EDA. Additionally, GUI 402 provides the user a select button 420 to enable the user to add additional attributes to the file. According to the illustrative embodiment, selection of select button 420 opens up a second window or expands the child window for file downloads, such as illustrated in FIGS. 4A and 4B. In one alternate embodiment, the GUI/window for file downloads automatically provides the additional fields for the EAs and does not require the user to click on a select button as required in FIG. 4A.

Notably, however, irrespective of which embodiment is utilized/implemented, the download of the file automatically triggers the browser to retrieve specific data from the site from which the file is being sourced. This data includes those illustrated in FIG. 4B and FIG. 4C.

In FIG. 4B, for example, download of a file from a server on the Internet also retrieves attributes that include the URL 405 of the site from which the file is downloaded, the source of the file 407, the file name/title 409, date of last modification 411A of the file and/or file version 411B, and the size of the file 413. Additionally, user entered information 415 may be received from the user in description field 414. Description field 414 is a text field that enables the user to enter his personal set of information (descriptive or otherwise) to the file attributes. This user-entered information may be of any nature and relevant to either the user or persons who may later access the file. For example, if the user is completing research that leads to the download and storage of the file, rather than simply entering a description of the file, the user may choose to enter the name of the research project and/or the client for which the research is being completed, as well as the relevance of the file to the overall research. At the bottom of the GUI 402 is a save button 417, which when activated, saves the file along with the attributes in the selected directory.

Figure 3:
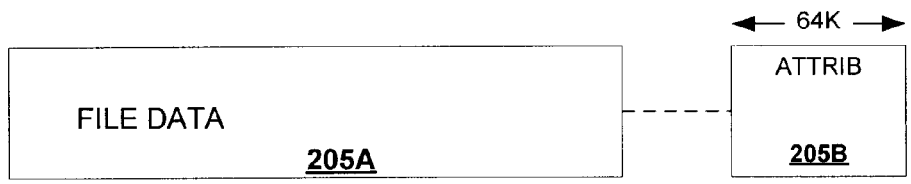
FIG. 3 is a block diagram representation of a file and associated extended attributes according to one embodiment of the invention.

FIG. 3 illustrates a sample file object that may be stored in memory 103 of local system 202. As shown, file object 205 comprises two blocks, namely file data 205A and meta-data or EA 205B. When stored, the EA 205B associated with a file attribute are not included as part of the file objects data, but are maintained and managed by the file system that manages that file object. The EAs 205B are thus associated with the file data 205A but not appended to the file data 205A. For illustrative purposes, the extended attribute block is assumed to be a 64K byte field. Applications define and associate EAs 205B with a file object through file system function calls. Each EA consists of a name and a value, which is based on the functionality of the particular attribute. In one alternate embodiment, a straight file is provided that includes the EA. The EA is copied with data if stored in the straight file and attempts to copy the attributes/data requires copying of the file also, and vice-versa.

Figure 5A:
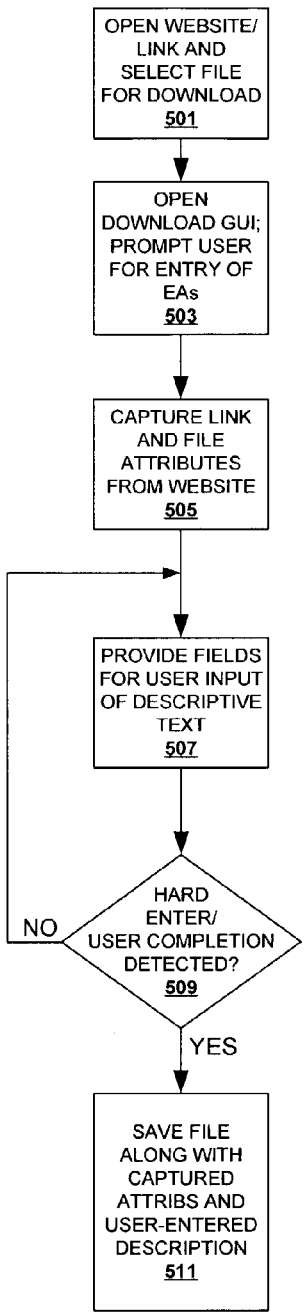
FIG. 5A is a flow chart illustrating the process of downloading a file with extended attributes and additional descriptive information according to one embodiment of the present invention.

Turning now to FIG. 5A, there is illustrated a flow chart of the process steps during download and storage of a file with meta-tags of EAs according to one implementation of the invention. The process begins at block 501, which indicates the user opening the website and selecting a particular file for download. The file download GUI of the browser is opened and the user is provided a prompt (via a select button) for retrieval and entry of additional extended attributes as depicted at block 503. The web address/link and other available file attributes are automatically captured from the website as shown at block 505. As illustrated at block 507, several user-entry fields are provided in which the user may enter descriptive information, including the file name and general descriptive data. The software then waits for a hard "return" (save button select) from the user as depicted at decision block 509. Once the user selects the save button, the file download is completed and the file is saved along with the EAs as depicted at block 511.

Figure 4D:
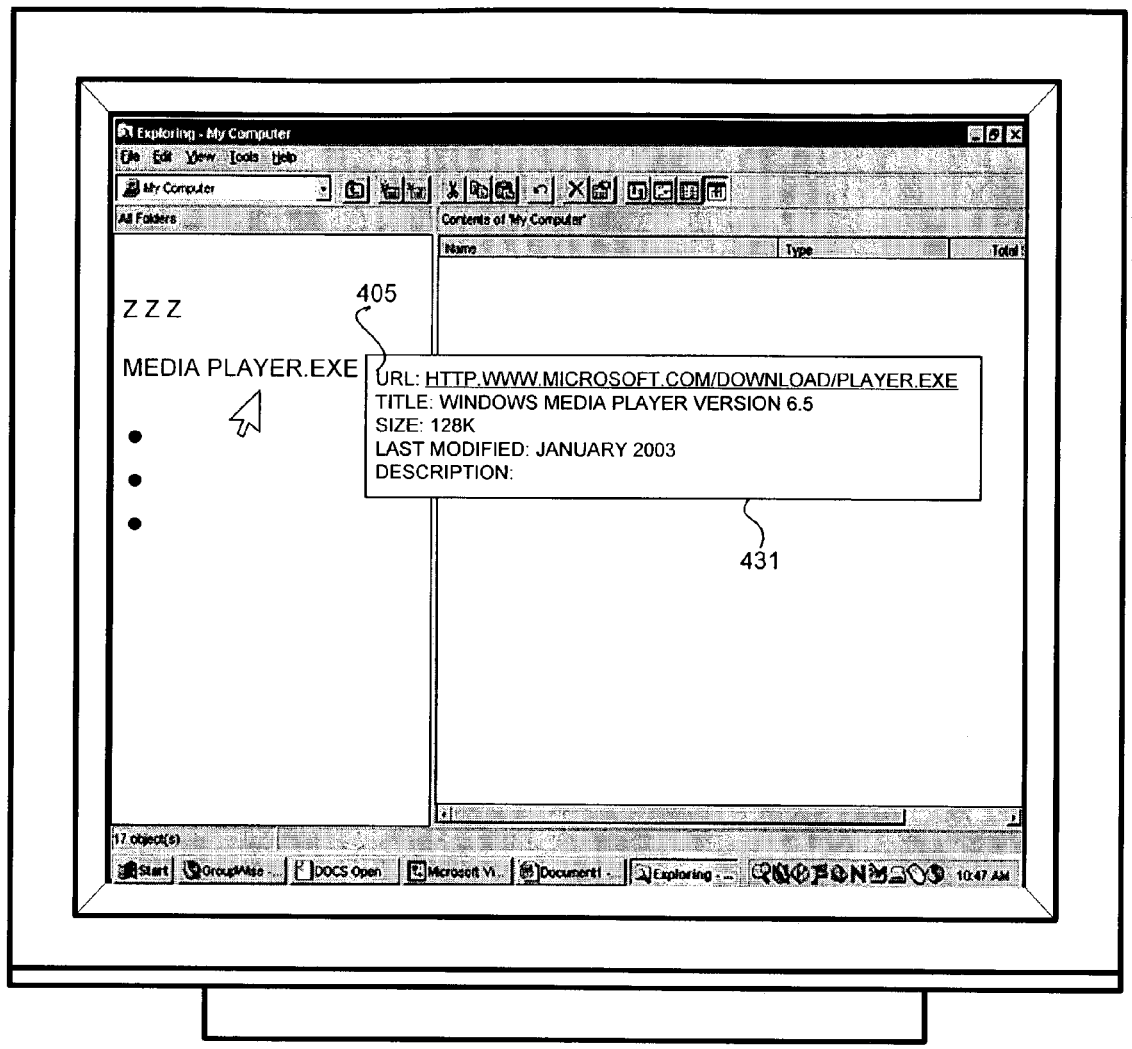

In the embodiment illustrated by FIG. 4C, the executable file of windows media player is downloaded from its parent site at Microsoft.com and saved with EA information including date last modified. As illustrated in FIG. 4D, when the user later accesses the directory of the local system, the directory interface lists all of the files within that directory. When the user right clicks the mediaplayer.exe filename, pop-up window (dialog box) 431 opens and displays the various EA that were saved along with the file. In an alternative embodiment, the EAs are displayed by changing the directory view and moving the cursor over the filename. Notably, the URL 405 of the file is hyper-linked. The user may thus automatically return to the site from which the file was downloaded by clicking on the URL. Since the file indicates an upgrade in June 2003, the user may wish to quickly access the site on that date to check for the upgrade to the file.

Figure 5B:
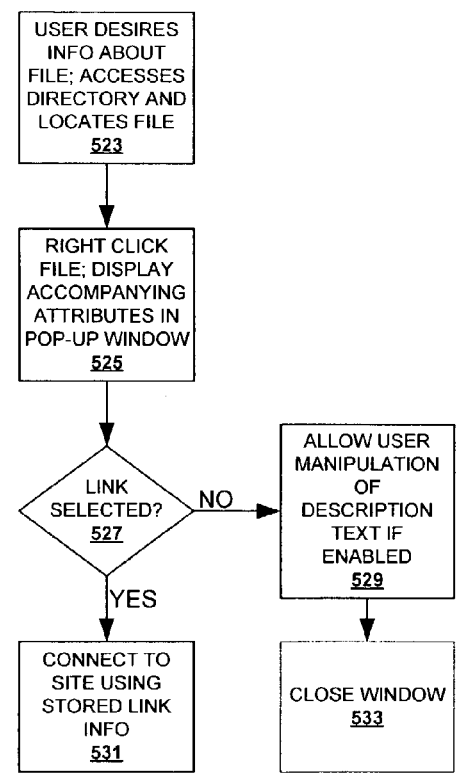
FIG. 5B is a flow chart illustrating the process of viewing the extended attributes and descriptive information of a downloaded file within a directory according to one embodiment of the invention.

FIG. 5B illustrates the process of accessing the file on the user's computer following the download and save operation of FIG. 5A. The process begins at block 523, which illustrates a user who desires information about a file opening up a directory to locate the file. The actual process by which the user accesses the directory to view the file may vary based on implementation. The user may be scrolling through his/her directory files and become curious about the content of a particular file. In the illustrative embodiment, it is assumed that the user does not necessarily desire to open or run the file, but simply wants to view the EAs with information about the file. As shown at block 525, the user right clicks the file and the accompanying attributes for that file are displayed in a pop-up window. While the file's EAs are being displayed, the software monitors for selection of the associated URL (or link) within the pop-up window. In the illustrative embodiment, when the link is selected, a browser application is immediately initiated, the browser is opened, and assuming the computer has a live connection to the Internet, the site from which the file was originally downloaded is opened on the browser as indicated at block 531. Also in the illustrative embodiment, a user with authorization may be allowed to manipulate the user entered description of the file as indicated at block 529. However, this feature requires some security so that other users of the local computer system may not tamper with descriptive information associated with a file. The pop-up window is then closed as shown at block 533 so that the EAs remain in the background and are only displayed when specifically required by the user.

The invention thus allows for storage of additional information about a file including from which location/site the file was downloaded. With this information, a user may determine other characteristics about the file. For example, a news file downloaded form cnn.com is more likely to be believable than a similar file downloaded from inquirer.com. In addition, the user is provided quick access to information about the file and the ability to revisit the site from which the file was originally obtained. The invention further eliminates the need to actually launch/open the file in order to determine what the descriptive content of the file is. Desirability of this feature may be with executables that were downloaded but which would conflict with already opened applications. The user does not have to launch the executable to discover what application is being installed. Also, with the ability to automatically return to the source site, the user is able to quickly check for newer versions of a program or gather other information relative to the file. Notably, in one embodiment, some updates of attribute information related to a particular file may also be automatically retrieved and stored within the EA stored on the local system when the site is revisited by selecting the URL Some features of the invention which differentiates the invention from the methods currently available (e.g., the Download Butler 2.0) include: (1) the EDO utility is able to be run inside of the web browser and not merely as a separate application; (2) the utility provides a hyperlink to the URL rather then just the bare URL without hyperlink functionality. The utility also provides other HTTP page information besides the URL; and (3) by utilizing the EA utility features, the user is able to view the additional information (EA/meta-data) without a specialized application.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as Read Only Memories (ROMs) or Erasable, Electrically Programmable Read Only Memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. In a data processing system having a storage medium, a display device, input device, and communication means for connecting to a network device, a method for providing enhanced file download and identification, said method comprising:
   automatically retrieving additional file identifying data when a file is selected for download, wherein said additional file identifying data includes at least source information identifying a location from which said file is being downloaded;
   receiving user inputs entered in a user-entry field displayed on said display device, said user inputs including additional information other than a name and local storage directory for said file; and
   storing said file along with an associated extended attribute (EA) file object that includes said additional file identifying data and the additional information provided by said user inputs, wherein said additional file identifying data and said additional information provided by said user inputs are separately accessible and viewable using the EA file object, without opening said file.

2. The method of claim 1, wherein, said method further comprises automatically retrieving said additional file identifying data along with the filename of said file from a network site at which said file is made available for download, wherein said retrieving is initiated in response to a request for download of said file, and wherein said source information includes a universal resource locator (URL) address of said network site.

3. The method of claim 2, further comprising displaying a download graphical user interface (GUI), wherein said download GUI includes said filename, a directory to which said file is to be stored, and both said additional file identifying data and said user-entry field.

4. The method of claim 3, further comprising:
   responsive to said user selecting a save option within said download GUI, automatically storing said additional file identifying data and said additional information provided by said user entry as the EA file object of said file; and
   linking said extended attribute file object to said file such that said extended attribute file object is automatically copied and transferred along with said file whenever said file is copied and transferred.

5. The method of claim 2, further comprising:
   communicatively connecting said data processing system to a server hosting said page; and
   accessing a background information from said page during said download, said background information including meta-data.

6. The method of claim 1, further comprising opening said extended attribute file object responsive to a user selection of said file for display of the file's extended attribute, wherein content of said extended attribute file object is displayed within a pop-up child window.

7. The method of claim 6, wherein said opening of said extended attribute file includes opening said file via one of (1) right clicking on said file and (2) setting a display option of the directory application to automatically display said extended attribute file when said file name is highlighted.

8. The method of claim 2, wherein:
   said storing step includes storing said URL address as a hot link within the EA file object; and
   said method further comprises automatically opening said network site from which said file was downloaded when said URL address within the EA file object is selected.

9. On a data processing system having communication access to a network that hosts downloadable files, a utility that provides enhanced file download and identification, said utility comprising:
   means for automatically retrieving additional file identifying data when a file is selected for download, wherein said additional file identifying data includes at least source information identifying a location from which said file is being downloaded;
   means for receiving user inputs entered in a user-entry field displayed on said display device, said user inputs including additional information other than a name and local storage directory for said file; and
   means for storing said file along with an associated extended attribute (EA) file object that includes said additional file identifying data and the additional information provided by said user inputs as, wherein said additional file identifying data and said additional information provided by said user inputs are separately accessible and viewable using the EA file object, without opening said file.

10. The utility of claim 9, wherein said utility further comprises:

means for automatically retrieving said additional file identifying data along with the filename of said file from a network site at which said file is made available for download, wherein said retrieving is initiated in response to a request for download of said file and wherein said source data includes an address of said network site and said additional file identifying information includes meta-data within a background of said network site;

means for displaying a download graphical user interface (GUI), wherein said download GUI includes said filename, a directory to which said file is to be stored, and both said additional file identifying data and said user-entry field.

11. The utility of claim 10, further comprising:

means, responsive to said user selecting a save option within said download GUI, for automatically storing said additional file identifying data and said additional information provided by said user entry as the EA file object of said file; and means for linking said extended attribute file object to said file such that said extended attribute file object is automatically copied and transferred along with said file whenever said file is copied and transferred.

12. The utility of claim 10, wherein said address is stored as a hot link, said utility further comprising:

means for opening said extended attribute file object responsive to a user selection of said file for display of the file's extended attribute, wherein content of said extended attribute file object is displayed within a pop-up child window, wherein said opening of said extended attribute file includes open said file via one of (1) right clicking on said file and (2) setting a display option of the directory application to automatically display said extended attribute when said file name is highlighted; and means for automatically opening said network site from which said file was downloaded when said hot link is selected by a user.

13. A nonvolatile, hard-coded type media and recordable type media for providing enhanced file download and identification, said program product comprising:

a computer readable medium; and program code on the computer readable medium for:

automatically retrieving additional file identifying data when a file is selected for download, wherein said additional file identifying data includes at least source information identifying a location from which said file is being downloaded;

receiving user inputs entered in a user-entry field displayed on said display device, said user inputs including additional information other than a name and local storage directory for said file; and storing said file along with an associated extended attribute (EA) file object that includes said additional file identifying data and the additional information provided by said user inputs, wherein said additional file identifying data and said additional information provided by said user inputs are separately accessible and viewable using the EA file object, without opening said file.

14. The computer program product of claim 13, wherein, said program product further comprises program code for automatically retrieving said additional file identifying data along with the filename of said file from a network site at which said file is made available for download, wherein said retrieving is initiated in response to a request for download of said file and wherein said source information includes a universal resource locator (URL) address of said network site.

15. The computer program product of claim 14, further comprising program code displaying a download graphical user interface (GUI), wherein said download GUI includes said filename, a directory to which said file is to be stored, and both said additional file identifying data and said user-entry field.

16. The computer program product of claim 15, further comprising:

program code that, responsive to said user selecting a save option within said download GUI, automatically stores said additional file identifying data and said additional information provided by said user entry as the EA file object of said file; and program code for linking said extended attribute file object to said file such that said extended attribute file object is automatically copied and transferred along with said file whenever said file is copied and transferred.

17. The computer program product of claim 14, further comprising program code for:

communicatively connecting said data processing system to a server hosting said page; and accessing a background information from said page during said download, said background information including said meta-data.

18. The computer program product of claim 13, further comprising program code for opening said extended attribute file object responsive to a user selection of said file for display of the file's extended attribute, wherein content of said extended attribute file object is displayed within a pop-up child window.

19. The computer program product of claim 18, wherein said program code for opening of said extended attribute file includes code for enabling opening of said file via one of (1) right clicking on said file and (2) setting a display option of the directory application to automatically display said extended attribute when said file name is highlighted.

20. The computer program product of claim 14, wherein:

said program code for storing includes code for storing said URL address as a hot link within the EA file object; and said program product further comprises program code for automatically opening said network site from which said file was downloaded when said URL address within the EA file object is selected.

* * * * *